(12) United States Patent
Benner et al.

(10) Patent No.: US 7,251,999 B2
(45) Date of Patent: Aug. 7, 2007

(54) LEVEL SENSOR FOR A FUEL TANK

(75) Inventors: Hans-Guenter Benner, Kriftel (DE);
Bernd Pauer, Eppstein (DE); Robert Peter, Sulzbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/552,924

(22) PCT Filed: Mar. 17, 2004

(86) PCT No.: PCT/EP2004/002780

§ 371 (c)(1),
(2), (4) Date: Oct. 11, 2005

(87) PCT Pub. No.: WO2004/092691

PCT Pub. Date: Oct. 28, 2004

(65) Prior Publication Data

US 2006/0191334 A1  Aug. 31, 2006

(30) Foreign Application Priority Data

Apr. 16, 2003  (DE) ................................ 103 17 809

(51) Int. Cl.
*G01F 23/00* (2006.01)
*G01F 23/32* (2006.01)

(52) U.S. Cl. ........................................ 73/313; 116/229

(58) Field of Classification Search .................. 73/313, 73/305, 317, 314; 116/228, 229; 340/625, 340/623

See application file for complete search history.

(56) References Cited

U.S. PATENT DOCUMENTS

| 5,117,693 | A | 6/1992 | Duksa .......................... 73/317 |
| 6,176,134 | B1 | 1/2001 | Langer ........................ 73/317 |
| 6,267,007 | B1 * | 7/2001 | Gunther ....................... 73/317 |
| 6,467,514 | B1 * | 10/2002 | Korst et al. ................. 141/198 |
| 2005/0103103 | A1 * | 5/2005 | Newman et al. .............. 73/313 |

FOREIGN PATENT DOCUMENTS

| DE | 43 00 383 A1 | 7/1994 |
| DE | 197 51 210 A1 | 5/1999 |
| DE | 199 25 185 C2 | 12/2000 |
| FR | 2 661 498 A1 | 10/1991 |
| JP | 05118895 A | 5/1993 |
| JP | 2001124615 A | 5/2001 |
| WO | WO 00/60321 | 10/2000 |

* cited by examiner

*Primary Examiner*—Hezron Williams
*Assistant Examiner*—Tamiko Bellamy
(74) *Attorney, Agent, or Firm*—Hanley, Flight & Zimmerman, LLC

(57) ABSTRACT

In a level sensor (2) for a fuel tank, one end of a lever wire (7) is located at a distance from a bearing (11) of a bracket (5). The bracket (5) has two limbs (12, 13) of which one holds the lever wire (7) and the other controls the signal transmitter (8). This enables the level sensor (1) to be calibrated in a particularly easy manner.

6 Claims, 1 Drawing Sheet

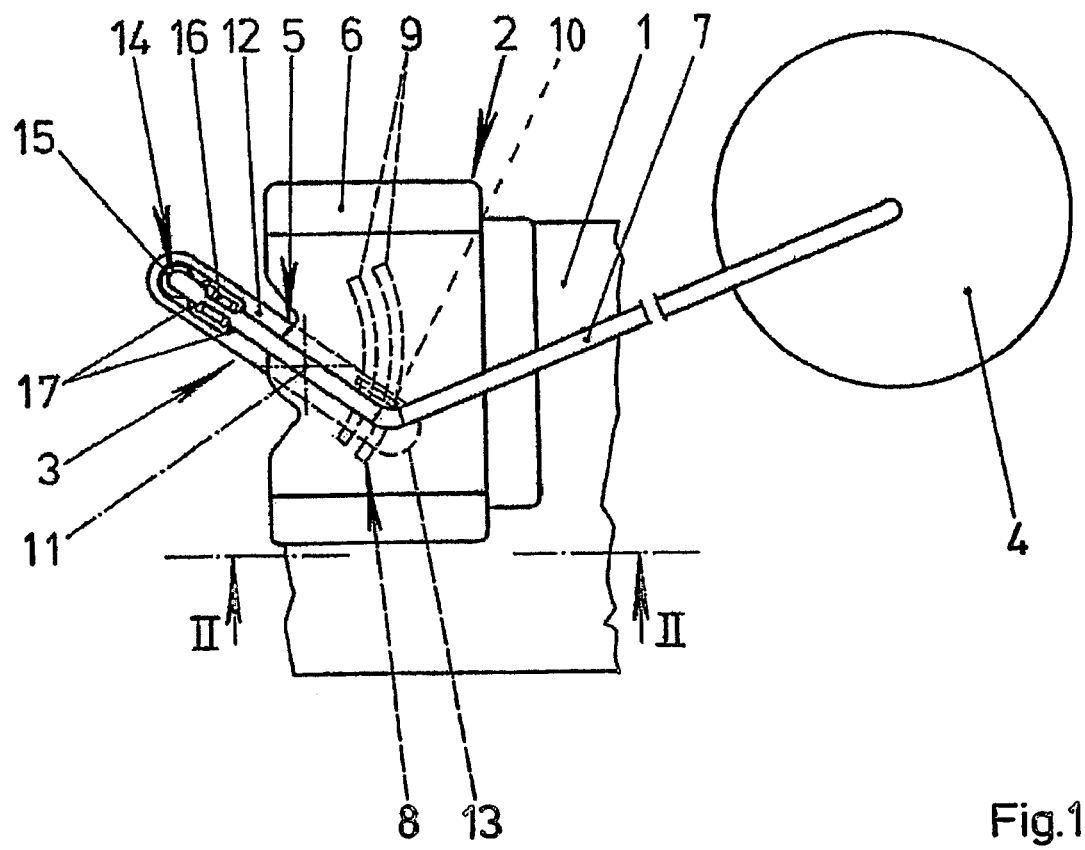
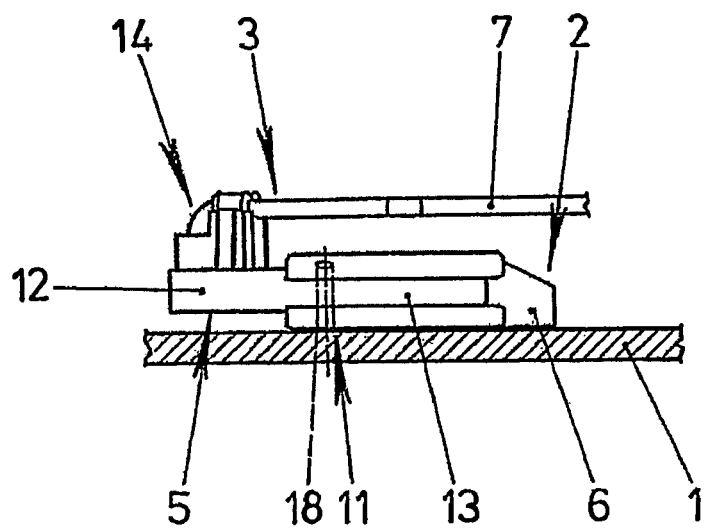
Fig. 1
Fig. 2

LEVEL SENSOR FOR A FUEL TANK

BACKGROUND OF THE INVENTION

The invention relates to a level sensor for a fuel tank for generating electrical signals as a function of a pivot angle of a lever arm, which is fitted with a float, for a tank of a motor vehicle, having a support which is provided for attaching it to a side wall in the tank, having a bracket which is made of plastic and can pivot in a bearing of the support, having a lever wire which holds the float and is attached to the bracket, and having a signal transmitter which is actuated by the bracket.

Level sensors of this type are frequently used in fuel tanks of modern motor vehicles and are known in practice. In the known level sensor, an angled section of the lever wire forms a bearing axis for the lever arm. The angled section is routed through holes in the bracket and in the support. The two-part design of the lever arm from a metal lever wire and a bracket usually made of plastic has the advantage that the introduction of vibrations into the bracket and thus into the signal transmitter, in the form of a potentiometer for example, can be kept low. Furthermore, following installation of the level sensor, the lever wire can be bent back in the fuel tank in order to compensate for installation tolerances.

One disadvantage of the known level sensor is that a burr at the end of the angled section of the lever wire may damage the holes in the bracket and in the support, so that the movement of the float deviates from a circular path. In order to prevent damage to the holes, the free end of the angled section has to be deburred, and this is complicated. Furthermore, the angle of the angled section is usually only 89° or less instead of 90°, in order to prestress the bearing. Prestressing the bearing allows a small amount of play. However, this also leads to the movement of the float deviating from a circular path. The level sensor is therefore very difficult to calculate and calibrate.

The invention is based on the problem of developing a level sensor of the type mentioned in the introduction such that it can be produced and calibrated in the most cost-effective way possible.

BRIEF DESCRIPTION OF THE INVENTION

According to the invention, this problem is solved in that that end of the lever wire which is remote from the float is attached to the support at a distance from the bearing of the bracket.

By means of this design, the bracket is mounted on the support independently of the installation of the lever wire. Therefore, a burr at the end of the lever wire does not lead to damage of the bearing of the lever arm. Since the bearing of the bracket is not affected by the lever wire, it can be designed to be particularly flat and short. On account of the invention, deburring of the lever wire can be avoided. The angled section provided to attach the lever wire to the support may additionally be angled at 90°, which leads to the float moving in an arc of a circle which is easy to calculate. Furthermore, the bracket and the support can each be produced from plastic with a high degree of accuracy, which allows the level sensor according to the invention to be calibrated in a simple manner.

According to an advantageous development of the invention, the introduction of vibrations and fluctuations of the float into the signal transmitter can be kept particularly low when the bracket has two limbs which project from the bearing, and when the free end of the lever wire is arranged on a first limb and the second limb is designed to actuate the signal transmitter. This prevents sliding contacts of a signal transmitter in the form of a potentiometer lifting off from wiper tracks. One further advantage of this design is that the arrangement of the signal transmitter on the support by a correspondingly angled section of the limbs can be freely selected independently of the pivot range of the lever wire. This simplifies calculation and calibration of the level sensor. The signal transmitter may be, for example, a magnetically active position sensor or a potentiometer.

According to another advantageous development of the invention, the lever wire can be attached to the bracket in a simple manner when an angled section of the free end of the lever wire penetrates a recess in the first limb of the bracket, and when the recess is arranged at the end which is remote from the bearing of the bracket.

According to another advantageous development of the invention, a vibration damper being arranged in the recess contributes to reducing measurement errors of the signal transmitter. This permits at least a small relative movement of the lever wire with respect to the bracket. This prevents vibrations or small fluctuations of the lever wire being introduced into the bracket and affecting the signal transmitter. Such vibrations or fluctuations often lead to sliding contacts of the signal transmitter in the form of a potentiometer lifting off. In the case of signal transmitters in the form of magnetically active position sensors, fluctuations in the distance of a magnet above a thick-film measuring system are reduced in this way.

According to another advantageous development of the invention, the lever wire being arranged on that side of the support which is remote from the signal transmitter contributes to further reducing the introduction of vibrations into the signal transmitter.

According to another advantageous development of the invention, a second vibration damper being arranged on a section of the first limb of the bracket, this section being routed parallel to the lever wire, contributes to further reducing the introduction of vibrations into the signal transmitter.

BRIEF DESCRIPTION OF THE DRAWINGS

The invention permits numerous embodiments. In order to further explain the basic principle of the invention, one of said embodiments is described in the text which follows and is illustrated in the drawing, in which:

FIG. 1 shows a level sensor according to the invention attached on a wall, and

FIG. 2 shows a sectional illustration through the wall from FIG. 1 with the level sensor according to the invention.

DETAILED DESCRIPTION OF THE INVENTION

FIG. 1 shows a level sensor 2 mounted on a vertical wall 1 within a fuel tank. The level sensor 2 has a float 4 attached to a lever arm 3. The lever arm 3 is pivotably mounted on a support 6 with a plastic bracket 5 and has a lever wire 7 for holding the float 4 attached to the bracket 5. The float 4 follows a fuel level in the fuel tank and pivots the lever arm 3 in the process. The pivot angle of the lever arm 3 is detected by a signal transmitter 8 in the form of a potentiometer. The signal transmitter 8 has two wiper tracks 9 arranged on the support 6 and a sliding contact 10 attached to the bracket 5. The sliding contact 10 is in the form of a double contact for bridging the wiper tracks 9 and is prestressed against these wiper tracks in a sprung manner. The bracket 5 has a bearing 11 with a bearing axis which runs perpendicular to the plane of the drawing. Two limbs 12, 13 of the bracket 5 lead away from the bearing 11. A first limb 12 is connected to the lever wire 7, whereas the second limb 13 holds the sliding contact 10 on that side of the support 6 which is remote from the lever wire 7. An angled section 14 of the lever wire 7 is inserted into a recess 15 in the first limb 12. The first limb 12 also has a clip connection 16, with two vibration dampers 17, for holding the lever wire 7.

In a sectional illustration through the wall 1 and the level sensor 2 from FIG. 1 along line II-II, FIG. 2 shows that the bearing 11 has a bearing bolt 18 which is pressed into the bracket 5 and penetrates the support 6. The bearing bolt 18 may be made of metal.

The invention claimed is:

1. A level sensor for generating electrical signals as a function of a lever arm comprising:
    (a) a float (4) having a float arm (7) attached to an end thereof;
    (b) a support (6) for attachment to a side wall of a vehicle fuel tank;
    (c) a bracket (5) having a first limb (12) and a second limb (13);
    (d) a bearing (11) pivotally joining the bracket (5) on the support (6) at a location between the first and second limbs; and
    (e) means connecting the end of the float arm furthest from the float to first limb (12) at a location a predetermined distance from the bearing (11), whereby damaging vibration can be eliminated from the level sensor.

2. The level sensor as claimed in claim 1, characterized in that the bracket (5) has two limbs (12, 13) which project from the bearing (11), and in that the free end of the lever wire (7) is arranged on a first limb (12) and the second limb (13) is designed to actuate the signal transmitter (8).

3. The level sensor as claimed in claim 1 or 2, characterized in that an angled section (14) of the free end of the lever wire (7) penetrates a recess (15) in the first limb (12) of the bracket (5), and in that the recess (15) is arranged at the end which is remote from the bearing (11) of the bracket (5).

4. The level sensor as defined in claim 3, wherein a vibration damper (17) is arranged in the recess (15).

5. The level sensor as defined in claim 1, wherein the lever wire (7) is arranged on that side of the support (6) which is remote from the signal transmitter (8).

6. The level sensor as defined in claim 4, wherein two vibration dampers (17) are arranged on a section of the first limb (12) of the bracket (5), this section being routed parallel to the lever wire (7).

* * * * *